United States Patent [19]

Dontscheff

[11] Patent Number: 4,519,285
[45] Date of Patent: May 28, 1985

[54] CUTTING METHOD AND APPARATUS FOR TAPE LAYING MACHINES

[75] Inventor: Helmut Dontscheff, Tacoma, Wash.

[73] Assignee: The Boeing Company, Seattle, Wash.

[21] Appl. No.: 509,665

[22] Filed: Jun. 30, 1983

[51] Int. Cl.³ ............................................. B26D 3/08
[52] U.S. Cl. ....................................... 83/880; 83/887; 83/176; 83/449; 83/471.2; 83/489; 83/508
[58] Field of Search ................. 83/879, 880, 881, 887, 83/886, 56, 433, 471.2, 471.3, 477.1, 483, 485, 487, 488, 614, 508, 508.2, 176, 17-21, 449, 444, 489; 156/523, 584

[56] References Cited

U.S. PATENT DOCUMENTS

| | | | |
|---|---|---|---|
| 349,388 | 9/1886 | Fowler | 83/21 |
| 2,158,790 | 5/1939 | Arthur | 164/43 |
| 2,382,406 | 8/1945 | Engberg | 164/42 |
| 2,637,394 | 5/1953 | Fey | 164/49 |
| 3,426,629 | 2/1969 | Herzig et al. | 83/176 X |
| 3,435,717 | 4/1969 | Macomber | 83/176 |
| 3,558,109 | 1/1971 | Sofue | 263/3 |
| 3,732,769 | 5/1973 | Loersch | 83/176 |
| 3,877,333 | 4/1975 | Illingworth et al. | 83/17 |
| 4,215,606 | 8/1980 | Britt | 83/23 |
| 4,354,408 | 10/1982 | Carte | 83/162 |

OTHER PUBLICATIONS

Design News p. 136, Jan. 24, 1983 issue, "CNC machine slashes laminated composites cost", by E. J. Stefanides.

Primary Examiner—James M. Meister
Attorney, Agent, or Firm—Delbert J. Barnard; Joan H. Pauly

[57] ABSTRACT

A tape (100) is transported by a continuous strip of backing paper (102) along a tape guide (22) into position for the tape (100) to be cut by a blade (12). The tape guide (22) has an essentially flat center portion (24) and opposite side portions (28) that are inclined toward blade (12) relative to center portion (24). Side portions (28) are preferably smoothly curved. Side portions (28) guide the lateral edges of the tape (100) and paper (102) to bend toward blade (12) when a lateral cut is being made. This allows a cut of essentially constant depth to completely sever tape (100), including any fibers (106) that have come loose from the edges of paper (102), without severing paper (102).

7 Claims, 6 Drawing Figures

CUTTING METHOD AND APPARATUS FOR TAPE LAYING MACHINES

TECHNICAL FIELD

This invention relates to methods and apparatus for cutting strip or sheet material and, more particularly, to such a method and apparatus in which only the top layer of a double layer is cut and in which the lateral edges of the layers are guided toward the cutter to insure that all the fibers on the edges of the top layer are cut to completely sever the top layer.

BACKGROUND ART

This invention is directed primarily toward providing an improved cutting system for use in tape laying machines. Such tape laying machines are known in the art and are used for manufacturing aircraft structures from composite tape materials. An example of a type of tape laying machine into which the method and apparatus of the present invention could advantageously be incorporated is the machine developed by the Vought Corporation and described in the Jan. 24, 1983 issue of Design News, in the article on pages 136 and 137 entitled "CNC Machine Slashes Laminated Composite Cost".

The composite tape materials used in conjunction with automatic tape laying machines for manufacturing aircraft structures are normally provided in double layer form. The top layer is the composite material itself, and the bottom layer is backing paper. The purposes of the backing paper include preventing the sticking together of layers of the composite material in rolls of the tape, preventing resin build-up on machine parts, and providing a continuous strip for transporting the tape from the supply reel. Because of the last named purpose, it is of course necessary to avoid cutting through the paper when the top layer of composite tape material is cut.

A problem that is encountered with known methods for cutting the top layer is that a few fibers at the lateral edges of the composite material sometimes escape being cut. One cause of this problem is the tendency of some cutters to push or pull these fibers off the backing paper. Another cause is inherent in the nature of the composite material and the manner in which the tape is manufactured. The composite material includes numerous fibers in a bonding medium. The double-layer tape is manufactured in wide sheets that are cut longitudinally to form double-layer tapes of a desired width. When the longitudinal cuts are made, some of the composite fibers are pushed down by the longitudinal cutter and end up adjacent to the lateral edge, rather than the top surface, of the backing tape. The cutting apparatus of conventional tape laying machines misses these fibers when making lateral cuts of the composite material.

The undesirability of such missed fibers should be obvious. If they are not detected in time, they will be pulled along with the backing paper as the tape laying head moves into position to lay the next course. This ruins the course of composite material that has just been laid. The machine has to be stopped and the damaged composite material must be removed before the tape laying process can be resumed. This results in considerable additional expense due to increased personnel costs, wasteful downtime of an expensive tape laying machine, and waste of the damaged composite material which must be discarded. Even if the missed fibers are detected in time, the cost of the operation is still significantly increased. The machine must be stopped to allow the missed fibers to be cut by hand. Again valuable machine time is lost and personnel costs are increased. The machine operator has idle time and at least one extra worker is required just to watch for missed fibers, shut down the machine as necessary, and hand cut missed fibers. In addition to the increased cost, the hand cutting process has the added disadvantage of being relatively imprecise, resulting in a lessening of the quality of the finished composite structure.

The primary object of the present invention is to solve the problem of missed fibers to thereby decrease the cost of the tape laying operation and improve the quality of the finished product.

The following U.S. Pat. Nos. each disclose apparatus for cutting and/or processing strip or sheet material:

349,388, granted Sept. 21, 1886, to F. A. Fowler;
2,158,790, granted May 16, 1939, to H. J. Arthur;
2,382,406, granted Aug. 14, 1945, to R. E. Engberg;
2,637,394, granted May 5, 1953, to M. J. Fey;
3,435,717, granted Apr. 1, 1969, to J. K. Macomber;
3,558,109, granted Jan. 26, 1971, to M. Sofue;
3,732,769, granted May 15, 1973, to J. Loersch;
3,877,333, granted Apr. 15, 1975, to E. A. E. Illingworth et al;
4,215,606, granted Aug. 5, 1980, to J. P. Britt; and
4,354,408, granted Oct. 19, 1982, to C. R. Carte.

Macomber U.S. Pat. No. 3,435,717 and Carte U.S. Pat. No. 4,354,408 each discloses apparatus that includes a scissor-type cutter. Sofue U.S. Pat. No. 3,558,109 does not disclose any cutter. The remaining seven patents each discloses a guillotine or punch-type cutter. Except for Sofue U.S. Pat. No. 3,558,109, which does not disclose any cutting apparatus or procedure, each of the ten above-listed patents discloses cutting completely through the sheet material being processed.

In the apparatus of each of the ten above-listed patents, the sheet material being processed is bowed at some point during the processing. In Arthur U.S. Pat. No. 2,158,790, Engberg U.S. Pat. No. 2,382,406 and Carte U.S. Pat. No. 4,354,408 the bowing of the material is carried out for the purpose of stiffening the material and holding it in position to be easily grasped. In Fey U.S. Pat. No. 2,637,394, Sofue U.S. Pat. No. 3,558,109, and Loersch U.S. Pat. No. 3,732,769, the material is bowed to stiffen it in order to maintain a fixed length between two points (Fey), keep the material in a stable position for processing (Sofue), or keep the material in a stable position for cutting (Loersch). In Fowler U.S. Pat. No. 349,388 the purpose of bending the edges of the material is to bevel the edges. In Macomber U.S. Pat. No. 3,435,717, the purposes of bowing the material include engaging the feed means, registering a precut with the cutting means, and strengthening and coercing the material longitudinally. Illingworth et al U.S. Pat. No. 3,877,333 bow the material in order to advance the trailing edge toward the leading edge. In the Britt U.S. Pat. No. 4,215,606 apparatus, the material is bowed in order to form a break or cut across the lateral center of the material without stretching the connecting webs between the pieces of material, to control the length of the break, and to eliminate waste of the material.

The above patents and the prior art that is discussed and/or cited therein should be studied for the purpose of putting the present invention into proper perspective relative to the prior art.

DISCLOSURE OF THE INVENTION

A subject of the invention is an improvement in a tape laying machine of the type in which a tape to be laid is transported by a continuous strip of backing material and which has cutting means for making lateral cuts through the tape of essentially constant depth. According to an aspect of the invention, the improvement comprises a guide surface along which the tape and backing material move into position for the tape to be cut by the cutting means. This guide surface includes an essentially flat center portion and opposite side portions that are inclined toward the cutting means relative to the flat center portion. The side portions guide the lateral edge portions of the tape and backing material to bend toward the cutting means when a lateral cut is being made, to allow a cut of essentially constant depth to completely sever the tape, including any fibers that may have come loose from the edges of the backing material, without severing the backing material. The flat center portion is sufficiently wide to provide an uncut center portion of the backing material that is sufficiently wide to prevent any nicks in the lateral edge portions of the backing material from impairing the transport of the tape by the backing material. Preferably, the side portions are smoothly curved.

Another subject of the invention is an improvement in a tape laying machine of the type in which a tape to be laid is transported by a continuous strip of backing material, and which has cutting means for making lateral cuts through the tape of essentially constant depth and an anvil facing the cutting means for supporting the tape and backing paper when the tape is being cut. According to an aspect of the invention, the improvement comprises a guide surface along which the tape and backing material move into position for the tape to be cut by the cutting means. This guide surface includes two longitudinally spaced longitudinal sections, each of which has an essentially flat center portion and opposite side portions that are inclined toward the cutting means relative to the flat center portion. These longitudinal sections define a gap therebetween in which the anvil is positioned. The side portions guide the lateral edge portions of the tape and backing material, along the guide surface and across the gap, to bend toward the cutting means and away from the anvil when a lateral cut is being made, to allow a cut of essentially constant depth to completely sever the tape, including any fibers that may have come loose from the edges of the backing material, without severing the backing material. The flat center portions are sufficiently wide to provide an uncut center portion of the backing material that is sufficiently wide to prevent any nicks in the lateral edge portions of the backing material from impairing the transport of the tape by the backing material. Preferably, the side portions are smoothly curved.

Still another object of the invention is a method of completely severing tape without impairing the transport of the tape in a system in which tape in a tape laying machine is transported by a continuous strip of backing material and in which the machine has cutting means for making lateral cuts through the tape of essentially constant depth. According to an aspect of the invention, the method comprises moving the tape and backing material along a guide surface into position for the tape to be cut by the cutting means. The transverse center portions of the tape and the backing material are maintained in an essentially flat position. The lateral edge portions of the tape and the backing material are guided to bend toward the cutting means when a lateral cut is being made, to allow a cut of essentially constant depth to completely sever the tape, including any fibers that may have come loose from the edges of the backing material, without severing the backing material. A lateral cut of essentially constant depth is made through the tape.

Preferably, the step of making a lateral cut comprises moving a cutting blade laterally across the tape. In the preferred embodiment, the step of making a lateral cut further comprises rotating the cutting blade while moving it laterally across the tape.

Tape laying machines constructed according to the present invention solve the problem described above of fibers at the lateral edges of the composite tape material escaping being cut. The method and apparatus of the invention provide a solution to the problem without impairing the transport of the tape by the backing material and without disrupting the process of making lateral cuts of essentially constant depth. The solution provided by the present invention leaves the transverse center portion of the backing material intact while completely severing the tape. Because the lateral edge portions of the backing material bend toward the cutting means along with the tape, the lateral edge portions of the backing material are nicked when the lateral cut is made. However, these nicks are relatively small in comparison with the width of the intact center portion of the backing material and therefore do not in any way impair the transport of the tape by the backing material.

By providing a solution to the problem of missed fibers, the present invention avoids all of the disadvantages discussed above relating to such missed fibers. A course of tape just laid by the tape laying machine is completely severed so that it will not be disturbed by movement of the tape laying head into position to lay the next course. Since there are no missed fibers, there is no need to have an extra worker present to watch for missed fibers and no need to shut down the machine to cut missed fibers or remove damaged tape. The machine operator has no unnecessary idle time, and the machine can be used to maximum efficiency to accomplish a maximum amount of tape laying without unnecessary interruptions. The overall cost of the operation is decreased because of lower personnel costs, more efficient use of the expensive machinery, and minimal wastage of the composite tape. Moreover, the quality of the finished composite structure is maximized and is not impaired by relatively imprecise hand cutting.

These and other advantages and features will become apparent from the detailed description of the best mode for carrying out the invention that follows.

BRIEF DESCRIPTION OF THE DRAWINGS

In the drawings, like element designations refer to like parts throughout, and.

BEST MODE FOR CARRYING OUT THE INVENTION

Figure 1:
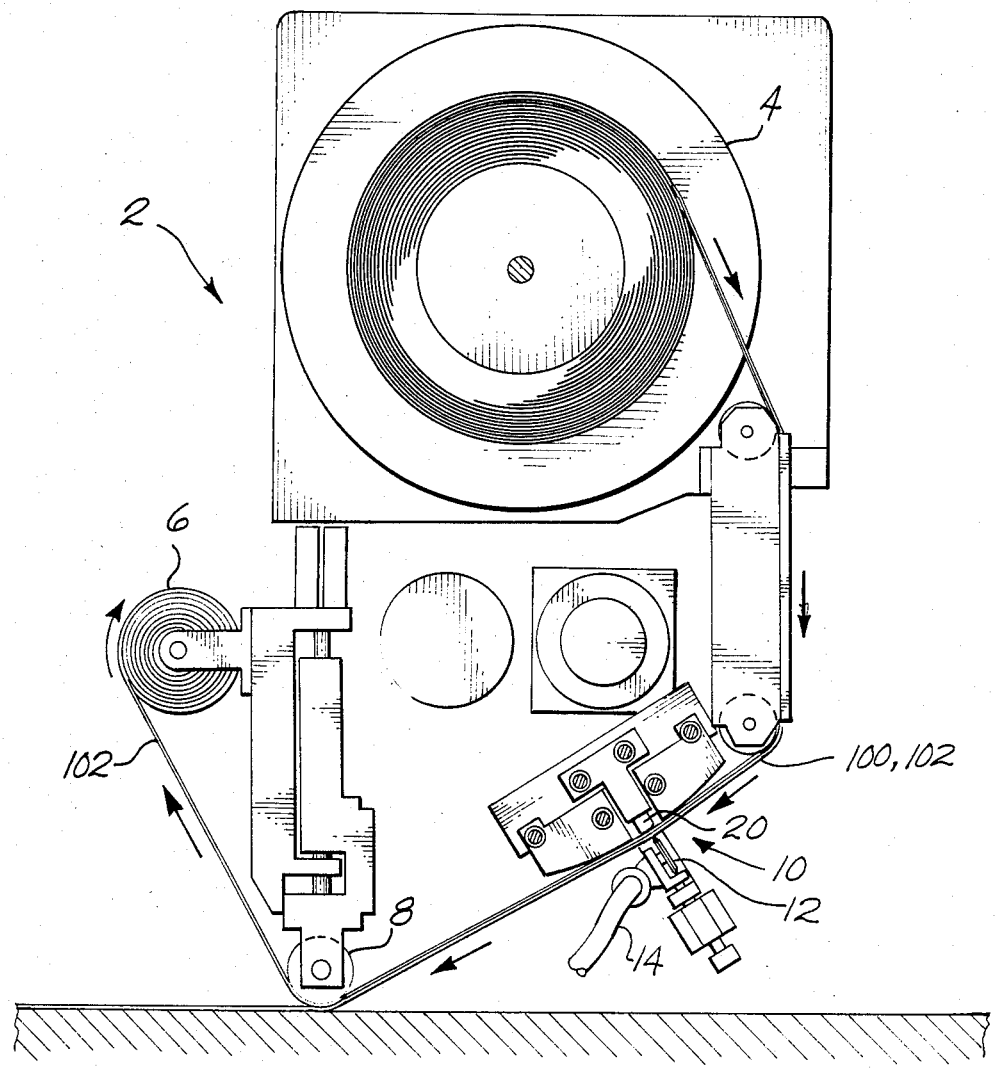
FIG. 1 is a side elevational view of a tape laying machine into which the preferred embodiment of the present invention has been incorporated.

The drawings show a tape laying machine 2 in which the cutting and tape guide apparatus 10 is constructed according to the invention and also constitutes the best mode of the invention currently known to the applicant. The illustrated machine 2 is of the type designed to lay tape on flat surfaces, as shown in FIG. 1. When a machine of this type is used in the manufacture of contoured aircraft structures, a flat structure is first produced by the tape laying operation and then is heat treated to cure it into the desired shape. The machine 2 is only one example of a type of machine into which the present invention may be incorporated to advantage. Another example is the type of tape laying machine that lays tape directly onto a contoured surface.

FIG. 1 is a simplified side elevational view of the machine 2 showing a number of conventional features. These conventional features include the supply reel 4, the take up reel 6, and the tape laying head 8. As in conventional tape laying machines, the tape 100 and backing paper 102 move from supply reel 4 down through the cutting apparatus 10 to the tape laying head 8. In general, the action of the tape laying head against the tape and paper 100, 102 is sufficient to pull the tape and paper 100, 102 from the supply reel 4. The axial shaft of the take up reel 6 is driven to rotate the reel 6 to insure that the paper 102 remains taut and moves smoothly from the downstream side of the head 8 to the reel 6. These features are conventional and are described herein to illustrate an environment in which the method and apparatus of the present invention may be used to advantage. It is of course to be understood that such conventional features may take various forms and may be changed, omitted, or added to without affecting the spirit and scope of the present invention.

Figure 2:
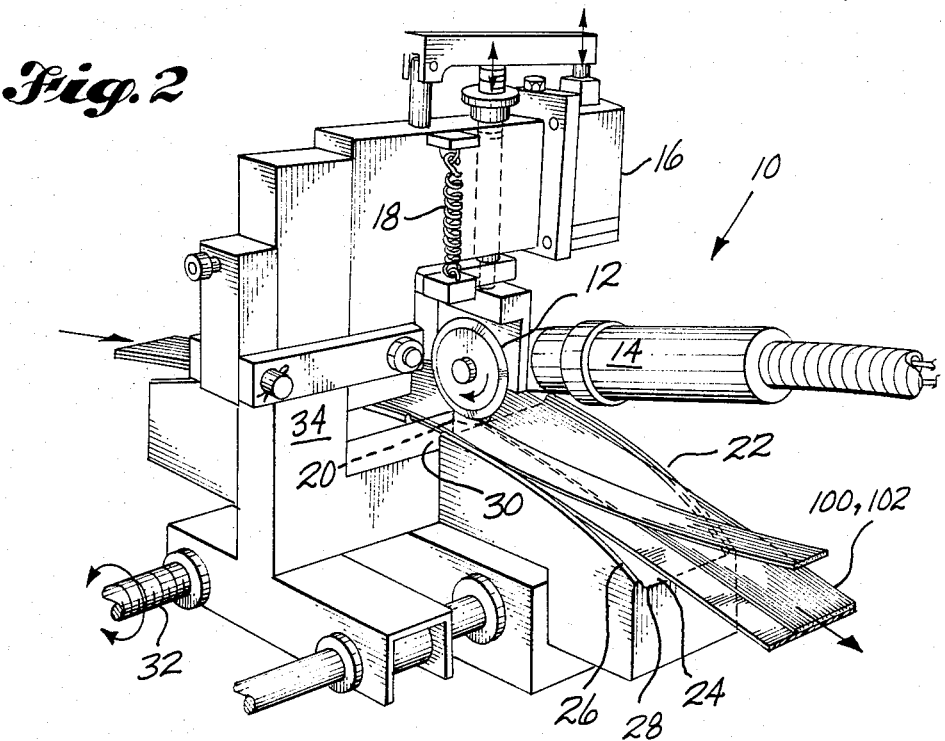
FIG. 2 is a pictorial view of the cutting and tape guide portions of the machine shown in FIG. 1, showing a lateral cut of a very small angle being made.
Figure 3:
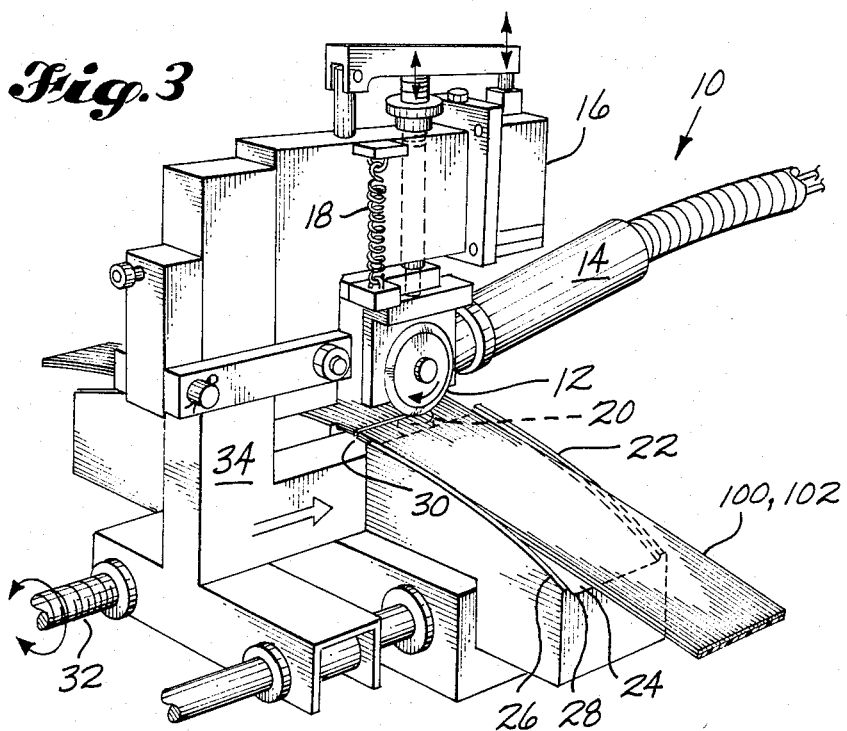
FIG. 3 is like FIG. 2 except that the cutter is shown making a lateral cut of about 90 degrees.

FIGS. 2 and 3 show the cutting and tape guide apparatus 10 of the machine 2. FIG. 2 shows a lateral cut of a very small angle, in the order of about 4 degrees, being made. FIG. 3 shows a lateral cut of approximately 90 degrees being made. Lateral cuts of both of the illustrated orders of magnitude, as well as lateral cuts intermediate between the illustrated cuts, can be made completely, efficiently, and accurately with apparatus constructed according to the present invention. It should be noted that throughout the description of the structure and operation of the preferred embodiment of this invention, the term "lateral" is intended to include any cut that extends from one side of the tape to the other regardless of the angle between the longitudinal axis of the tape and the cut.

The cutting apparatus 10 illustrated in the drawings utilizes a rotary cutter blade 12 for cutting the tape 100. It is of course to be understood that the method and apparatus of the present invention can be used to advantage with other known types of cutting blades in tape laying machines. However, a rotary cutting blade such as the blade 12 shown in the drawings is preferred because the overall efficiency of the machine and quality of the cut are greatest when a rotary cutter is used. Digital cutters have the disadvantages of being very complicated and of providing a cut that is a compromise in that it is a series of steps that only approximates the angle of cut desired. Guillotine cutters have the disadvantages of being very heavy, of requiring extremely fast movement if it is desired to make the cut without stopping the progress of the tape, and of either requiring a very large width of the blade or of being severely limited in the angle of the cut that can be made. The width required for a guillotine cutter to make the type of cut illustrated in FIG. 2 would be prohibitively large. A laterally moving cutting blade avoids these problems of digital and guillotine cutters. Given a laterally moving cutting blade, a rotary blade is preferable over a non-rotating blade that is pulled across the tape because the latter has a tendency to pull the tape out of the tape guide and also a tendency to pull fibers of the tape loose from the backing paper. In addition, such blades, when made from presently known materials, become dull much faster than a rotary blade because they have a single cutting point as opposed to the full circumference of cutting points in a rotary blade. Therefore, the method and apparatus of the present invention are preferably used in a tape laying machine that utilizes a rotary cutter blade.

The cutting method and apparatus of the present invention are used to best advantage in tape laying machines that also incorporate apparatus for accurately controlling the depth of the lateral cut. The best means known to the applicant for accurately controlling the depth of the cut is the subject of the applicant's copending application entitled Controlled Depth Cutting Method And Apparatus, which application was filed concurrently with the present application. The drawings show the preferred embodiment of the controlled depth cutting apparatus disclosed in the copending application. The apparatus includes the rotary cutter blade 12 and a drive motor 14 for the blade 12. The cutter may be driven by an electric motor or an air powered motor. The electric motor is generally preferred since air powered motors have a tendency to contaminate the atmosphere with particles of oil. Such contamination of the atmosphere is highly undesirable in an environment in which composite structures are being manufactured.

Referring to FIGS. 2 and 3, a solenoid 16 is provided for moving the cutter blade 12 toward the tape 100 and into its cutting position. A spring 18 moves the blade 12 back out of its cutting position when the solenoid 16 is not activated. An anvil 20 supports the tape 100 and backing paper 102 as the tape is being cut. In conventional tape laying machines, the anvil associated with the cutter is stationary. The anvil 20 shown in the drawings, in accordance with the invention disclosed in the copending application, moves laterally with respect to the tape as the cut is being made. As shown in FIGS. 2 and 3, both the cutter 12 and the anvil 20 are mounted on a C-shaped frame 34. A screw drive 32 is provided to move this frame 34 laterally to laterally move the cutter 12 and anvil 20. The simultaneous movement of the cutter 12 and anvil 20 allows a single support point on the anvil 20 to remain beneath the cutting point of the blade 12 throughout the entire length of the lateral cut. Therefore, the distance between the blade 12 and anvil 20 remains constant and the depth of the cut is kept constant to a highly accurate degree. This depth control is a part of the invention disclosed in the copending application discussed above and is in no way a part of the present invention. However, the two inventions are preferably used together in order to achieve maximum accuracy and efficiency in the cutting operation.

The preferred embodiment of the method and apparatus of the present invention includes a tape guide 22 that has two longitudinal sections that are spaced apart longitudinally to define a gap 30 therebetween. This gap 30 provides an opening to accommodate the moving C-shaped frame 34 and anvil 20. The tape 100 and backing paper 102 move along the tape guide 22 as they progress from the supply reel 4 to the tape laying head 8. The movement of the tape through the tape laying machine is indicated by the arrows in FIG. 1. The tape guide 22 guides the tape 100 and paper 102 into position for the tape 100 to be cut by the rotary cutter blade 12. In tape laying machines constructed according to the present invention, each of the two longitudinal sections of the tape guide 22 has an essentially flat center portion 24 extending along its length. Each longitudinal section also has two opposite sidewalls 26. Between each sidewall 26 and its associated flat center portion 24 is a side portion 28 that is inclined toward the cutting blade 12 relative to the flat center portion 24. These opposite side portions 28 of the tape guide 22 may be either angled or curved toward the cutting blade 12. However, in the preferred embodiment the side portions 28 are curved since it is easier to manufacture curved as opposed to angled side portions and since curved side portions result in smaller nicks in the lateral edges of the backing paper 102 produced during the cutting operation.

Figure 6:
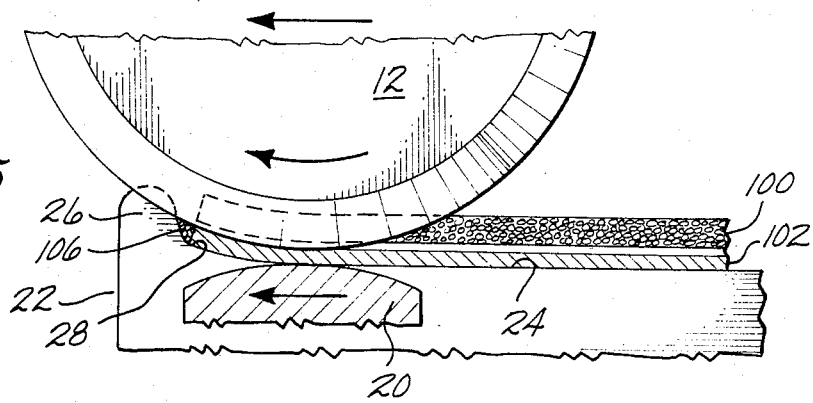
FIG. 6 is like FIG. 5 except that it illustrates a completed lateral cutting operation.

During the operation of the tape laying machine 2, the tape 100 and backing paper 100 are moved along the tape guide 22 onto the anvil 20 and into position for the tape 100 to be cut by the blade 12. As the tape 100 and paper 102 are being moved, the tape guide 22 maintains the transverse center portions of the tape 100 and paper 102 in an essentially flat position. The side portions 28 of the tape guide 22 guide the lateral edge portions of the tape 100 and paper 102 to bend toward the cutting blade 12 and away from the anvil 20. This bending of the lateral edge portions is maintained along both longitudinal sections of the tape guide 22 and across the gap 30 in which the anvil 20 is positioned. The support and guiding of the lateral edge portions on either side of the gap 30 into the bent or bowed position maintains the bending of the lateral edge portions toward the cutter blade 12 across the gap 30 when a lateral cut is being made. This allows a lateral cut of essentially constant depth to completely sever the tape 100, including any fibers that may have become loose from the edges of the backing paper 102, without severing the backing paper 102. The tape guide 22 is dimensioned so that the flat center portions 24 are sufficiently wide to provide an uncut center portion of the backing paper 102 that is sufficiently wide to prevent any nicks in the lateral edge portions of the backing paper 102 from impairing the transport of the tape 100 by the backing paper 102. The small nicks in the lateral edge portions of the paper 102 are best shown in FIG. 6.

Figure 4:
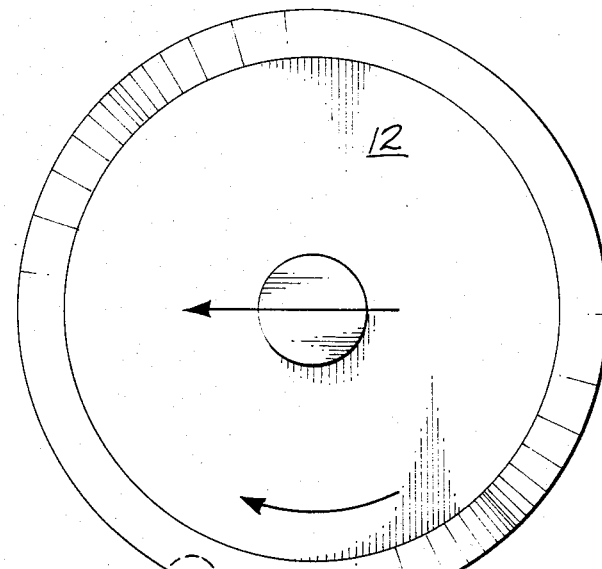
FIG. 4 is a detailed fragmentary elevational view of a prior art tape guide, showing tape fibers at the lateral edges of the backing paper being missed by the cutter.
Figure 5:
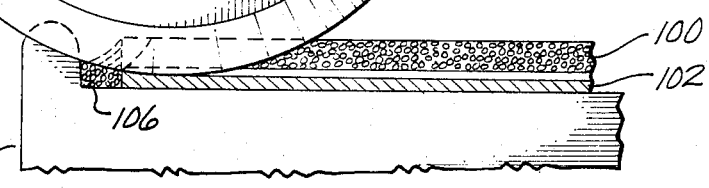
FIG. 5 is like FIG. 4 except that it shows a tape guide constructed according to the preferred embodiment of the invention with the tape fibers at the lateral edges of the backing paper in the path of the rotary cutter.

FIG. 4 shows a lateral cut being completed by use of apparatus that includes a conventionally constructed tape guide 122. As can be clearly seen, fibers 106 that have become loose from the top of the backing paper 102 and that are adjacent to the side edges of the paper 102 are not in the path of the cutting blade 12 and are escaping being cut. FIGS. 5 and 6 show the lateral cutting operation being carried out by use of the method and apparatus of the present invention. FIG. 5 illustrates the cutting operation near completion. FIG. 6 shows the cutting and guide apparatus 10 and the tape 100 and paper 102 after the cutting operation has been completed. As is clearly seen in FIG. 6, all of the loose fibers 106 have been severed to completely sever the tape 100. The cutting paper 102 remains intact except for a very small inconsequential nick at the lateral edge of the paper 102 and a minor grazing of the surface of the paper 102. Therefore, the paper 102 can continue to perform its function of transporting the tape 100 and the operation of the tape laying machine 2 may be carried forth without interruption.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the present invention as defined by the following claims.

What is claimed is:

1. An improved tape laying machine of the type in which a tape to be laid is transported by a continuous strip of backing material and which has cutting means for making lateral cuts through the tape of essentially constant depth, wherein the improvement comprises:

a guide surface along which the tape and backing material move into position for the tape to be cut by the cutting means; said guide surface including two longitudinally spaced longitudinal sections, each of which has an essentially flat center portion and opposite side portions that are inclined toward the cutting means relative to the flat center portion; and a support surface positioned longitudinally between said longitudinal sections and facing the cutting means for supporting the tape and backing material when the tape is being cut;

wherein said side portions guide the lateral edge portions of the tape and backing material, along the guide surface and across the support surface, to bend toward the cutting means and away from the support surface when a lateral cut is being made, to allow a cut of essentially constant depth to completely sever the tape, including any fibers that may have come loose from the edges of the backing material, without severing the backing material; and wherein said flat center portions are sufficiently wide to provide an uncut center portion of the backing material that is sufficiently wide to prevent any nicks in the lateral edge portions of the backing material from impairing the transport of the tape by the backing material.

2. A machine as described in claim 1, in which said side portions are smoothly curved.

3. An improved tape laying machine of the type in which a tape to be laid is transported by a continuous strip of backing material, and which has cutting means for making lateral cuts through the tape of essentially constant depth and an anvil facing the cutting means for supporting the tape and backing material when the tape is being cut, wherein the improvement comprises:

a guide surface along which the tape and backing material move into position for the tape to be cut by the cutting means; said guide surface including two longitudinally spaced longitudinal sections, each of which has an essentially flat center portion and opposite side portions that are inclined toward the cutting means relative to the flat center portion; said longitudinal sections defining a gap therebetween in which the anvil is positioned;

wherein said side portions guide the lateral edge portions of the tape and backing material, along the guide surface and across said gap, to bend toward the cutting means and away from the anvil when a lateral cut is being made, to allow a cut of essentially constant depth to completely sever the tape, including any fibers that may have come loose from the edges of the backing material, without severing the backing material; and wherein said flat center portions are sufficiently wide to provide an uncut center portion of the backing material that is sufficiently wide to prevent any nicks in the lateral edge portions of the backing material from impairing the transport of the tape by the backing material.

4. A machine as described in claim 3, in which said side portions are smoothly curved.

5. In a system in which tape in a tape laying machine is transported by a continuous strip of backing material and in which said machine has cutting means for making lateral cuts through the tape of essentially constant depth, a method of completely severing the tape without impairing the transport of the tape, said method comprising:

moving the tape and backing material along a guide surface into position for the tape to be cut by the cutting means;

maintaining the transverse center portions of the tape and the backing material in an essentially flat position and guiding the lateral edge portions of the tape and the backing material to bend toward the cutting means when a lateral cut is being made, to allow a cut of essentially constant depth to completely sever the tape, including any fibers that may have come loose from the edges of the backing material, without severing the backing material; and making a lateral cut through the tape of essentially constant depth.

6. A method as described in claim 5, in which the step of making a lateral cut comprises moving a cutting blade laterally across the tape.

7. A method as described in claim 6, in which the step of making a lateral cut further comprises rotating the cutting blade while moving it laterally across the tape.

* * * * *